L. Wallace.
Harvester.
No. 75606. Patented Mar. 17, 1868.
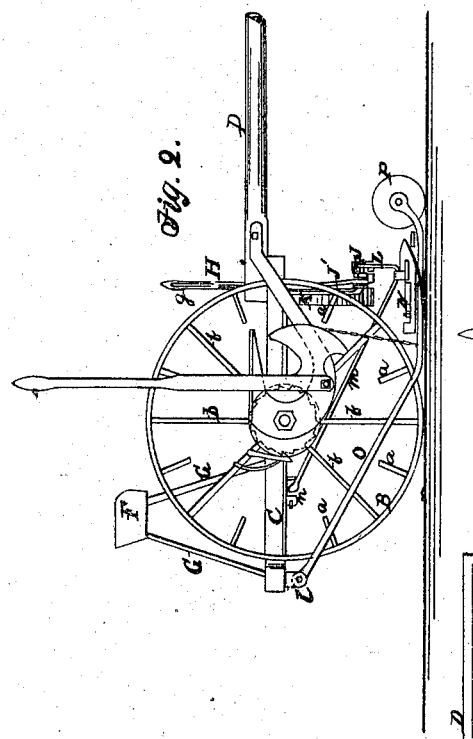
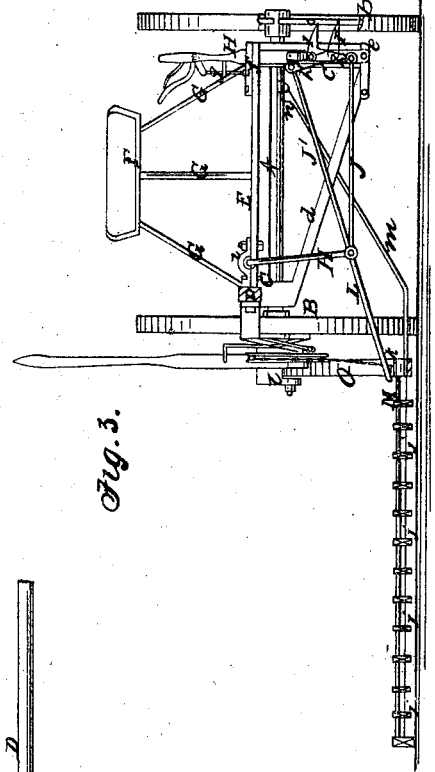
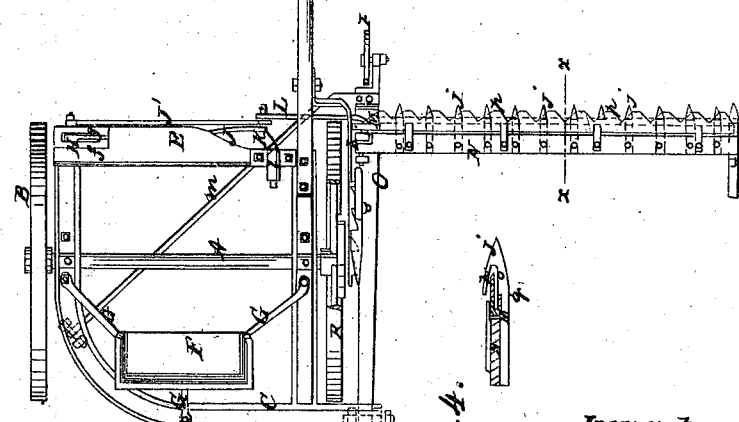
Witnesses.
Theo Frische
Wm Triem.
Inventor.
Lorenzo Wallace
Per Munn &
Attorneys.

UNITED STATES PATENT OFFICE.

LORENZO WALLACE, OF LEAVENWORTH, KANSAS.

IMPROVEMENT IN HARVESTERS.

Specification forming part of Letters Patent No. 75,606, dated March 17, 1868.

*To all whom it may concern:*

Be it known that I, LORENZO WALLACE, of Leavenworth, in the county of Leavenworth and State of Kansas, have invented a new and useful Improvement in Grain and Grass Harvesters; and I do hereby declare that the following is a full, clear, and exact description thereof, which will enable others skilled in the art to make and use the same, reference being had to the accompanying drawings, and to the letters of reference marked thereon.

This invention relates to a new and improved means employed for operating or driving the sickles of grain and grass harvesters, whereby the power is taken direct from the driving or supporting wheels of the machine, and a diminution of friction and consequent saving of power effected.

In the accompanying sheet of drawings, Figure 1 is a plan or top view of my invention; Fig. 2, a side view of the same; Fig. 3, a front view of the same; Fig. 4, a transverse section of the cutting apparatus taken in the line $x\ x$, Fig. 1.

Similar letters of reference indicate like parts.

A represents an axle, and B B the wheels thereof. C is the main frame, having bearings at its under side, in which the axle is fitted and allowed to rotate freely. D is the draft-pole, attached to the right-hand side of the main frame C, and E a plate at the front end of the main frame. F is the driver's seat, placed on supports G, which are secured to the main frame. The wheel B, at the left-hand side of the machine, is provided with intermediate arms or short spokes $a$ between the spokes $b$, as shown clearly in Fig. 2.

To the front end of the main frame C, at the left-hand side, there is attached a pendant, $c$, which is braced by an inclined bar, $d$, the latter being joined to the lower end of the pendant, and to the lower end of the pendant there is attached to, or cast with it, a step, $e$, in which the lower end of a hand-lever, H, is pivoted, said lever extending up through a guide, $f$, on the plate E, and having a spring-catch, $g$, applied to it. To this lever H there are attached two bent levers I I', one of which, I, is about of right-angular form, and the other, I', having its arms forming an obtuse angle with each other. (See Fig. 3.) These bent levers are pivoted to the hand-lever H at their angles, and in opposite positions, I' having an upright position if I be considered inverted.

The lower end of the arm $h$ of the lever I is connected by a rod, J, with the lower end of a vibrating rod, K, the bearing $i$ of which is on the plate E, and the upper arm $h'$ of the lever I' is connected by a rod, J', with the lower end of the rod K, as shown clearly in Fig. 3.

The lower end of the rod K is connected by a rod, L, with the cutter-bar M, which may be of the usual reciprocating kind, as shown in Fig. 1, and arranged to work in fingers or guards $j$ in the ordinary way.

When the hand-lever H is adjusted in a vertical position, and held in such position by the spring-catch $g$, the two bent levers I I' will be acted upon by the spokes $b$ $a$, and a reciprocating movement communicated to the cutter-bar M direct from the wheel B, all gearing being avoided, the levers I I' being alternately acted upon by the spokes $a$ $b$.

The motion of the cutter-bar may be stopped at any time by raising the spring-catch $g$, and throwing the lever H back, so that the spokes $a$ $b$ will not come in contact with the levers I I'.

The finger-bar N is attached to a bar, O, by a joint, $k$, and the rear end of O is attached to the rear of the main frame by a joint, $l$, the bar O being braced by a rod, $m$, the rear end of which is attached to the rear part of the main frame by a joint, $n$. By this arrangement the cutting apparatus is allowed to rise and fall, to conform to the inequalities of surface over which it may pass.

At the front of the bar O there is attached a gage-wheel, P. In the fingers or guides $j$ there are placed fixed cutters $o$, one in each finger, and over these cutters $o$ the cutters $p$ of the bar M work. The cutters $o$ are all attached to a bar, $q$, which is fitted in recesses in the fingers, just back of the cutter-bar M, as shown in Fig. 4.

The cutters $o$ may be detached at any time for sharpening, by taking out screws which secure the bar $q$ to the fingers.

Having thus described my invention, I claim as new and desire to secure by Letters Patent—

1. The spokes $a\ b$, in combination with the bent levers I I', adjustable hand-lever H, connecting-rods J J', vibrating rod K, connecting-rod L, and cutter-bar M, as herein described, for the purpose specified.

2. The attaching of the bent levers I I' to the hand-lever H, arranged substantially as shown, and provided with a spring-catch, $g$, for the purpose of rendering the cutter-bar inoperative whenever desired.

LORENZO WALLACE.

Witnesses:
  RICHARD B. REES,
  A. J. BURNEY.